(12) United States Patent
Woodruff et al.

(10) Patent No.: US 7,090,445 B2
(45) Date of Patent: Aug. 15, 2006

(54) TOOL WITH SELECTIVELY-BIASED MEMBER

(75) Inventors: David C. Woodruff, Morrow, OH (US); Stan C. Weidmer, Cincinnati, OH (US)

(73) Assignee: Makino, Inc., Mason, OH (US)

( * ) Notice: Subject to any disclaimer, the term of this patent is extended or adjusted under 35 U.S.C. 154(b) by 0 days.

(21) Appl. No.: 11/125,879

(22) Filed: May 10, 2005

(65) Prior Publication Data
US 2006/0159530 A1    Jul. 20, 2006

Related U.S. Application Data

(60) Provisional application No. 60/644,732, filed on Jan. 18, 2005.

(51) Int. Cl.
*B23B 51/06* (2006.01)

(52) U.S. Cl. .................. 408/59; 408/156; 408/714

(58) Field of Classification Search ............. 408/57, 408/59, 156, 157, 714
See application file for complete search history.

(56) References Cited

U.S. PATENT DOCUMENTS

| | | | | |
|---|---|---|---|---|
| 3,389,621 A | * | 6/1968 | Wear | 408/83 |
| 4,224,846 A | * | 9/1980 | Eysel et al. | 82/158 |
| 4,941,782 A | * | 7/1990 | Cook | 408/147 |
| 5,304,019 A | * | 4/1994 | Klee et al. | 408/156 |
| 5,540,526 A | | 7/1996 | Hyatt et al. | |
| 5,800,252 A | | 9/1998 | Hyatt | |
| 6,238,150 B1 | * | 5/2001 | Yamada et al. | 408/224 |
| 6,270,295 B1 | | 8/2001 | Hyatt et al. | |
| 6,536,998 B1 | | 3/2003 | Hyatt et al. | |
| 6,585,571 B1 | | 7/2003 | Hyatt et al. | |
| 6,729,810 B1 | | 5/2004 | Hyatt et al. | |
| 6,926,475 B1 | * | 8/2005 | Kress et al. | 408/156 |

\* cited by examiner

*Primary Examiner*—Boyer D. Ashley
*Assistant Examiner*—Ali Abdelwahed
(74) *Attorney, Agent, or Firm*—Frost Brown Todd LLC

(57) ABSTRACT

A tool for working a workpiece has a slot provided between a pair of extremities at its distal end. The extremities have cutting blades mounted thereon. The slot is configured to receive a plate. The tool has a conduit running along its axis for communication of pressurized fluid to the slot and plate. The plate directs flow of the pressurized fluid outward toward the extremities. The resulting outward force causes the extremities to bend outward, thereby urging the cutting blades outward for cutting, reaming, or other working of the workpiece. The resilience of the tool causes the extremities to return back inward when the fluid pressure is reduced. A plate may be configured to receive a wafer for transferring force from the pressurized fluid to the extremities.

17 Claims, 8 Drawing Sheets

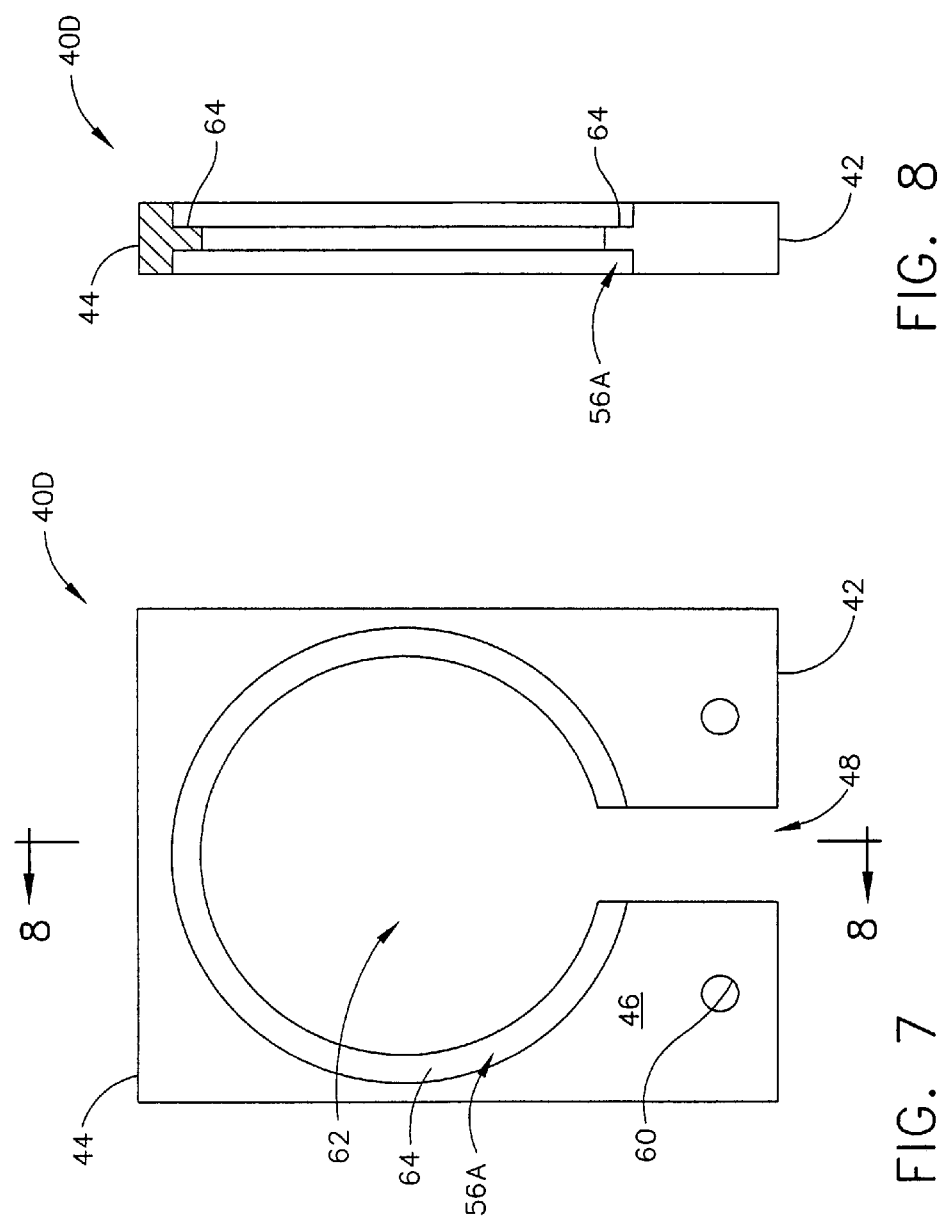

TOOL WITH SELECTIVELY-BIASED MEMBER

PRIORITY

This application claims priority from the disclosure of U.S. Provisional Patent Application Ser. No. 60/644,732, entitled "Tool with Selectively-Biased Member," filed Jan. 18, 2005.

BACKGROUND OF THE INVENTION

The present invention relates generally to boring and reaming tools, and is particularly directed to a radially-adjustable tool that may form or ream a bore having a relatively high length-to-diameter ratio.

In some conventional machining center rotating tools, lubricant is supplied to the vicinity of the cutting blade through the rotating shaft. An example is shown in U.S. Pat. No. 5,775,853 issued on Jul. 7, 1998, the disclosure of which is herein incorporated by reference. Another example is shown in U.S. Pat. No. 6,270,295 issued on Aug. 7, 2001, the disclosure of which is herein incorporated by reference. Yet another example is shown in U.S. patent application Ser. No. 10/654,328 filed on Sep. 3, 2003, the disclosure of which is herein incorporated by reference.

In many machine tool operations, including boring and reaming, the friction between the tool and workpiece may generate tremendous amounts of heat energy, which may reach temperatures of 2000° F. (1100° C.) and above. If left uncontrolled, such heat may severely damage (e.g., crack or otherwise fracture) the tool, thus reducing the tool life, making machine tool operations more dangerous and expensive, and reducing the quality and precision of the workmanship. In addition, heat-generated friction may discolor the workpiece, and may damage or remove temper or heat treatments. It is commonly known in the industry that coolant and/or lubricant may be introduced to the machining area, such as by spraying, to reduce friction between the tool and workpiece by providing such fluid between the cutting tool and the workpiece (e.g., at the tool-workpiece interface), to thereby help remove heat energy generated in machine tool operations.

Although coolant/lubricant fluid may be supplied to the machining area, it is often difficult to ensure that such fluid actually makes its way to the interface between the tool and all of the workpiece surfaces being machined. Additionally, fluid may evaporate quickly due to the high temperatures involved in machining operations. Thus, large volumes of coolant/lubricant fluid must generally be continuously supplied to the machining area for the tool to operate effectively. This need to keep coolant/lubricant fluid between the tool and wall of the bore hole may become even more problematic in operations where coolant/lubricant fluids cannot be introduced in close proximity to the machining areas while the tool is engaged with the interior surface of the workpiece. This problem may arise in the context of producing any type of bore, including a bore having a relatively high length-to-diameter ratio.

During use, the work engaging surface of the tool (e.g., a cutting blade or a support member opposing a blade) may also become loaded with particles or recently cut chips from the interior surface of the workpiece, which in turn, may reduce the accuracy and effectiveness of the tool through deteriorating machining ability, and/or clogging of conventional coolant/lubricant fluid supply openings. It may be preferred that the potential for this loading of particles be reduced, and that any loaded particles be removed from the tool as quickly as possible. Nozzle arrangements, such as an external cleaning jet, may be provided independent of the tool, for injecting coolant/lubricant fluid at increased velocities toward the work engaging surface and the work surfaces of the workpiece to wash away particles, to remove particles already loaded on the work surface, and to cool the tool and the workpiece. As mentioned before, it may be very difficult to ensure that the fluid sprayed in this way actually reaches the most critical areas of the tool/workpiece interface.

Other attempts to deliver coolant/lubricant fluid to the machining area have included air or other pneumatic carriers. As with externally applied liquid coolants/lubricants, when pneumatic carriers are used, resulting turbulence may hinder the machining operations, and often fluid cannot infiltrate into the actual machining area. Previously, attempts to address these two requirements of cooling and cleaning the tool and workpiece have tended to reduce the accuracy and utility of the tool.

As can be seen, many conventional tools have a number of shortcomings that may greatly reduce the accuracy of the tool, the tool's life, or its ability to be used with automatic tool changing systems. Many conventional structures and assemblies provide a tool having working surfaces that cannot expand to accommodate varying and different uses and needs. Such assemblies may result in uneven machining, and may reduce the assembly's usable life. A need currently exists in the machinery industry for a tool with a work engaging assembly having accurately controlled machining diameters so that bores of different sizes may be cut or reamed by the same tool, so that the tool should not become oversized as a result of excessive strokes of the tool, and so that the tool may expand in a radial direction uniformly and selectively.

In addition, those of ordinary skill in the art will appreciate the variety of challenges associated with forming bores of high length-to-diameter ratios, such as a length-to-diameter ratio of 5:1 or higher, for example. These challenges may be even greater when high precision of the bore diameter is desired, and particularly when it is desired that many bores be produced by the same tool in a relatively short period of time. As a practical matter, many conventional tools used for larger bores cannot be feasibly scaled down for use in the production of smaller-diameter bores, particularly small-diameter bores having a relatively great length. Meanwhile, conventional small-bore-producing tools may be susceptible to chatter and tool deflection that may adversely affect bore size or finish. Thus, a need exists for a boring tool with sufficient rigidity to form bores having a high length-to-diameter ratio with great precision.

Another challenge that may be encountered during the use of conventional boring tools in the production of a bore having a relatively great length is the torque encountered by such tools while boring. Those of ordinary skill in the art will recognize that the production of a bore having a relatively great length may require the use of a tool that also has a relatively great length. Such tool length may provide a corresponding relatively great torque arm length, which would be a factor in the calculation of the amount of torque experienced by the tool. When a cutting member is engaged with the bore surface of a workpiece, normal forces exerted by the workpiece (e.g., in reaction to forces exerted by the tool) against the distal or cutting end of the tool may be the source of such torque. Such torque may be further increased if the tool is urged in a direction transverse its axis at its proximal end during cutting. Those of ordinary skill in the art will appreciate the adverse effects that such torque may produce (e.g. wear of tool, bending of tool, weakening of material or mechanisms at or near the torque pivot point, etc.). Accordingly, there exists a need for a tool that may be used to produce bores of relatively great length without the problems associated torque on the tool.

Conventional boring devices may also require time consuming adjustments to be retracted from a bore. For example, the tool retraction process may entail stopping tool spindle rotation, repositioning the tool, then finally retracting the tool from the bore. If another bore is to be produced, rotation of the tool must be initiated again, which also takes time. Of course, such a time consuming retraction routine may be undesirable when time is of the essence, such as in a mass production context. Thus, there exists a need for a tool that may be rapidly retracted from a bore, particularly without the need to stop rotation of the tool or reposition its axis of rotation.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings:

FIG. 7 is a front elevational view of an embodiment of a plate for the tool of FIG. 1 configured to receive a wafer.

FIG. 8 is a cross-sectional side view of the plate of FIG. 7 taken along line 8—8.

Reference will now be made in detail to various embodiments of the invention, examples of which are illustrated in the accompanying drawings.

DETAILED DESCRIPTION OF EMBODIMENTS OF THE INVENTION

Figure 1:
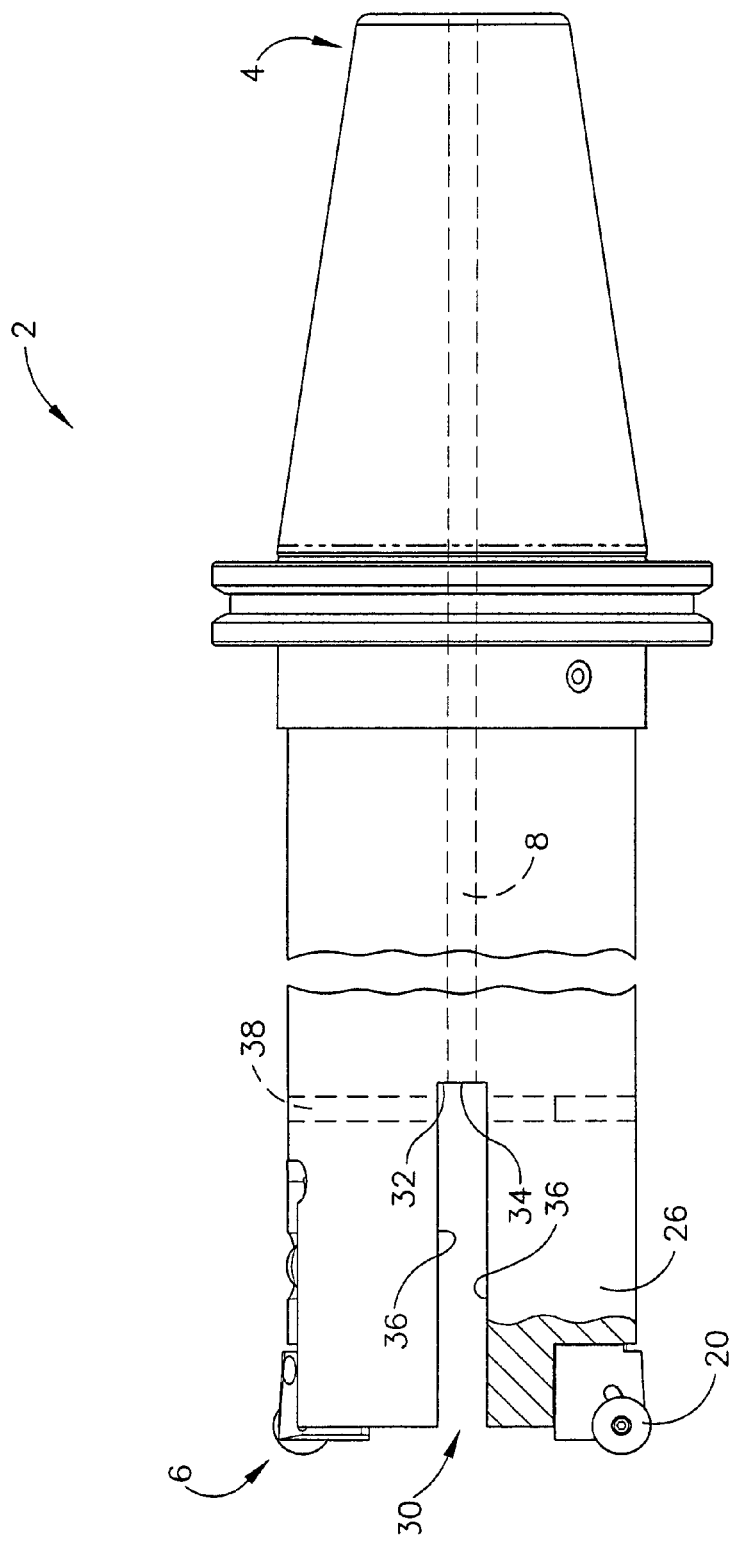
FIG. 1 is a partial cross-sectional side view of a tool constructed in accordance with the present invention.
Figure 2:
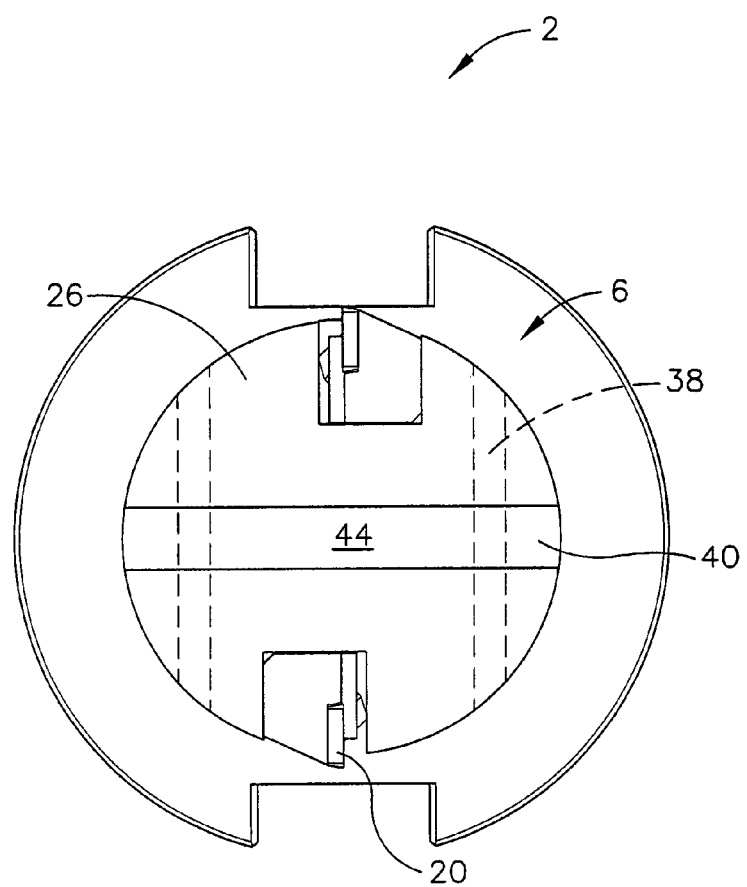
FIG. 2 is an end view of the tool of FIG. 1.

Referring now to the drawings in detail, wherein like numerals indicate the same elements throughout the views, FIGS. 1 and 2 show tool 2 having proximal end 4 and distal end 6. Conduit 8 runs along the axis of tool 2 from proximal end 4 toward distal end 6. As used herein, the term "conduit" is intended to include any channel or other structure of configuration through which fluid, materials, and the like may be conveyed, passed, or otherwise communicated. In the present example, conduit 8 is configured to permit communication of a fluid medium through tool 2. However, those of ordinary skill in the art will appreciate that other suitable configurations may be used to permit fluid communication.

In the present example, tool 2 is adapted for use with a machining station having a selectively rotatable machine spindle, and may quickly and easily receive and secure one of a plurality of tools for various operations (e.g., rotating, vibrating, oscillating, etc.). A machining station may have a synchronized system, such as an automatic tool changer for quickly and easily interchanging and utilizing multiple machining tools at one machining station, thereby allowing the machining station to provide greater utility or range of operations. Tool 2 is further configured for use with a source of a pressurized fluid medium for communication to conduit 8 in tool 2. The machining station permits a user to selectively control both the speed of tool 2 rotation and the pressure of the fluid medium being communicated to conduit 8. In one embodiment, the fluid medium is capable of providing lubrication and/or cooling of at least a portion of the interface between tool 2 and a workpiece.

In the present example, tool 2 is attachable to a selectively rotatable spindle at proximal end 4, and receives the pressurized fluid medium at proximal end 4. In this way, the interface of machining station and proximal end 4 of tool 2 is quite similar to the corresponding interface described in U.S. Pat. No. 6,270,295.

Figure 3:
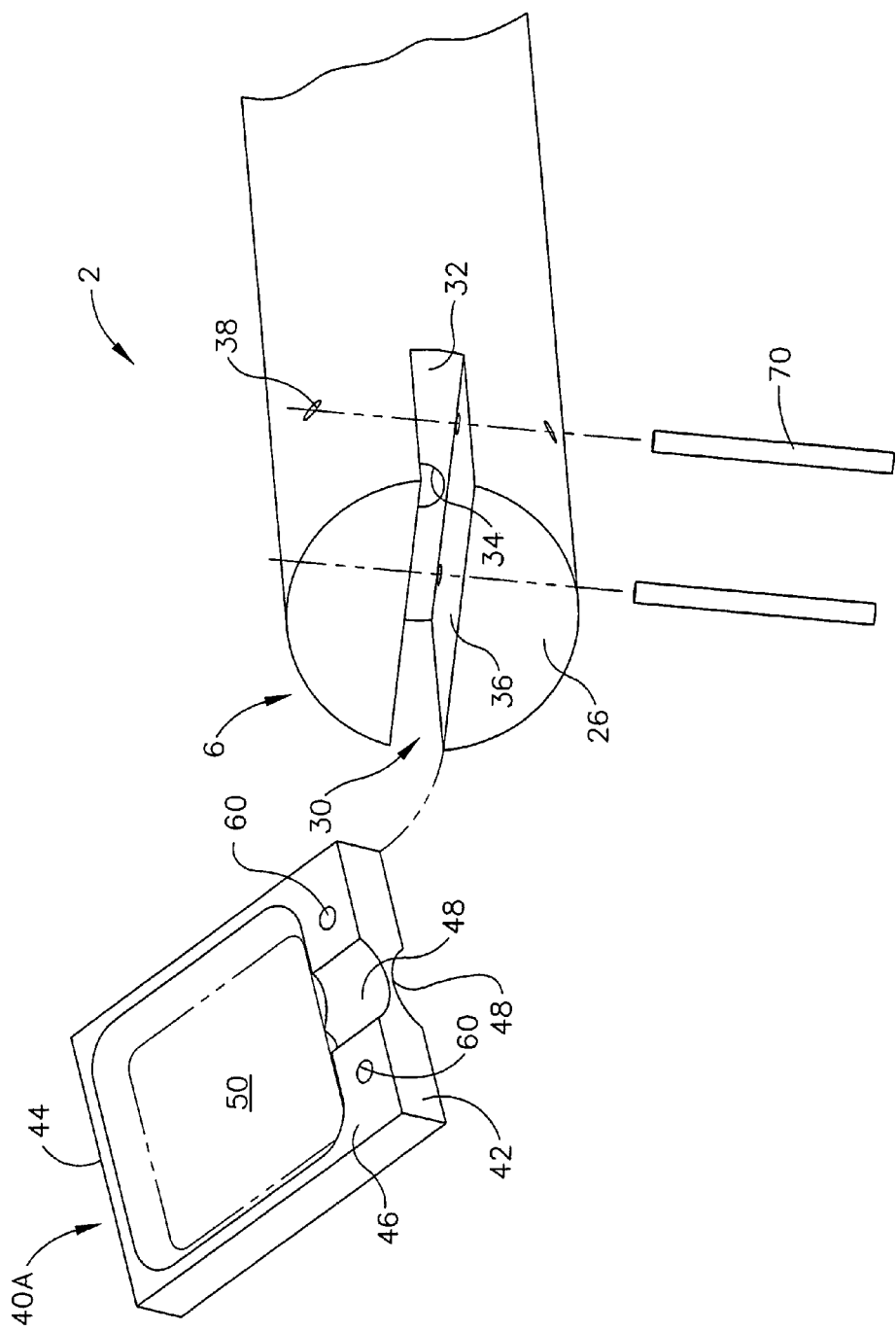
FIG. 3 is an exploded perspective view of the tool of FIG. 1.

Distal end 6 of tool 2 includes a pair of opposing cutting blades 20 mounted on extremities 26. FIG. 1 includes partial cross section of extremity 26 to show cutting blade 20. Slot 30 is defined between pair of extremities 26, and has plate 40A (not shown in FIG. 1) disposed therein. As shown in FIG. 3, which omits several elements of tool 2 for simplicity, dowel pins 70 may be used to hold plate 40A within slot 30. Other suitable distal end 6 configurations will be apparent to those of ordinary skill in the art, including but not limited to inserted members other than plate 40A.

Slot 30 is generally rectangular, and is defined by proximal surface 32 and two side surfaces 36. Proximal surface 32 has opening 34 along the axis of tool 2 for fluid communication with conduit 8. Each side surface 36 has a pair of pin openings 38. Each pin opening 38 extends completely through corresponding extremity 26 in a direction transverse the axis of tool 2, and is configured to receive dowel pin 70. Other suitable slot 30 configurations will be apparent to those of ordinary skill in the art.

By way of example only, distal end 6 of tool 2 may have a diameter of approximately 8 inches, 2 inches, 1.25 inches, 1 inch, or 32 mm. Slot 30 may have a width (i.e. distance between side surfaces 36) of approximately 0.375 inches or 5 mm. Of course, any other suitable dimensions may be used for tool 2 diameter and/or slot 30 width. Slot 30 may be 2.6 inches deep (i.e. distance from distal end of tool 6 to proximal surface 32 of slot 30 is 2.6 inches), 3.321 inches deep, or any other suitable depth.

Plate 40A has proximal end 42, distal end 44, and a pair of side surfaces 46. Plate 40A also has a pair of pin openings 60 formed through side surfaces 46, each opening 60 being configured to receive dowel pin 70. Plate 40A is configured to fit in slot 30, such as by an interference fit. Such an interference fit may be obtained where plate 40A has a thickness that is 0.001" greater than the width of slot 30, by way of example only. In one embodiment, slot 30 has a width of 0.374" while plate 40A has thickness of 0.375". Other suitable relative dimensions of slot 30 and plate 40A for producing any type or degree of interference fit will be apparent to those of ordinary skill in the art. Alternatively, slot 30 and plate 40A may be dimensioned such that the fit is not an interference fit. By way of example only, slot may have a width of 0.375" while plate 40A has a thickness of 0.374". In addition, plate 40A may be dimensioned such that its exposed outer surfaces are flush with or slightly recessed from the outer surfaces of tool 2.

FIG. 3 shows plate 40A, a simplified rendering of tool 2, and dowel pins 70 prior to insertion of plate 40A in slot 30. In the present example, with plate 40A properly positioned within slot 30, pin openings 38 of slot 30 align with pin openings 60 of plate 40A, such that dowel pins 70 may be placed through pin openings 38, 60 to secure plate 40A within slot 30. Alternatively, any other suitable configuration for securing plate 40A within slot 30 may be used.

In the present example, each side surface 46 of plate 40A has recess 50 formed therein. Each recess 50 has channel 48, also formed in respective side surface 46, leading to proximal end 42. Each channel 48 is configured to permit fluid communication to corresponding recess 50. In the present example, with plate 40A properly positioned within slot 30, each channel 48 will be in fluid communication with opening 34 in proximal surface 32 of slot 30, such that fluid may be communicated through conduit 8, through opening 34, and through channel 48 to reach each recess 50 in plate 40A. Alternatively, any other suitable configuration may be used to facilitate communication of a fluid medium to each recess 50.

Figure 4:
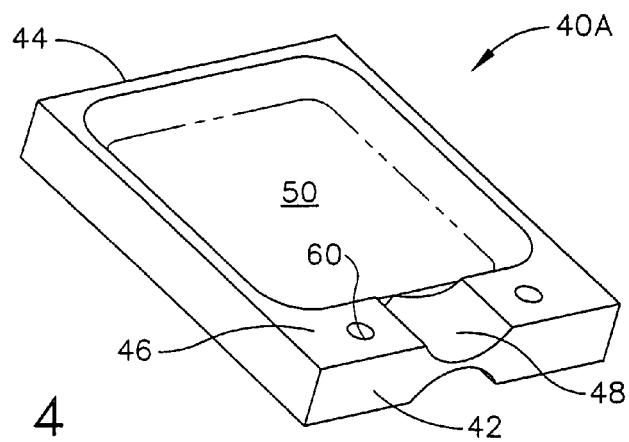
FIG. 4 is a perspective view of an embodiment of a plate for the tool of FIG. 1.
Figure 5:
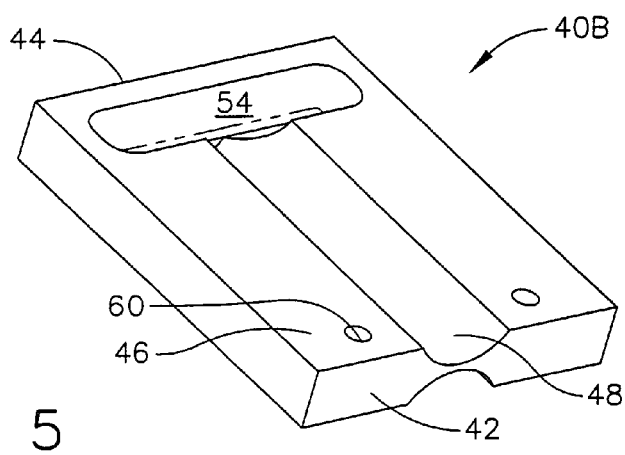
FIG. 5 is a perspective view of an embodiment of a plate for the tool of FIG. 1.
Figure 6:
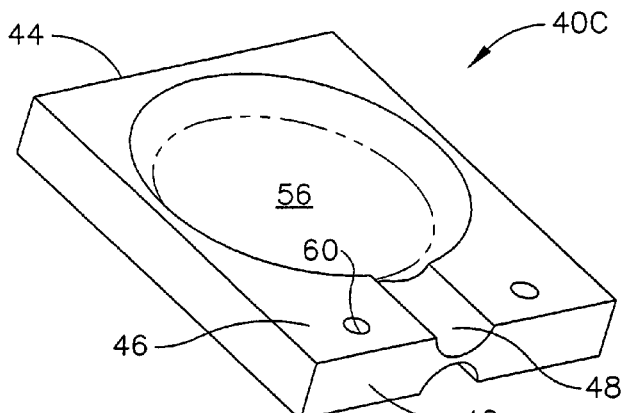
FIG. 6 is a perspective view of an embodiment of a plate for the tool of FIG. 1.

It will be appreciated that plate 40A may be modular in nature, such that a variety of types of plates 40A may be inserted in slot 30. An aspect of plate 40A that may be modified for such varying plate 40A types may be the configuration of recesses 50. As shown in FIGS. 3 and 4, recesses 50 may be generally rectangular in shape. Alternatively, as shown in FIG. 5, recesses 54 in plate 40B may be generally "T"-shaped. In yet another embodiment, shown in FIG. 6, recesses 56 in plate 40C are generally circular. Plate 40A configurations may also be varied as a function of recess 50 size, in addition to, or instead of, recess 50 shape. In one embodiment, recesses 50 on respective side surfaces 46 of plate 40A have substantially the same size and shape. Alternatively, recesses 50 on plate 40A may be sized and/or shaped differently. Still other suitable recess 50 configurations and variations will be apparent to those of ordinary skill in the art.

Plate 40A may be made of any suitable material or materials. By way of example only, plate 40A may be made of steel, aluminum, plastic, or any other suitable material, including combinations thereof.

Figure 9:
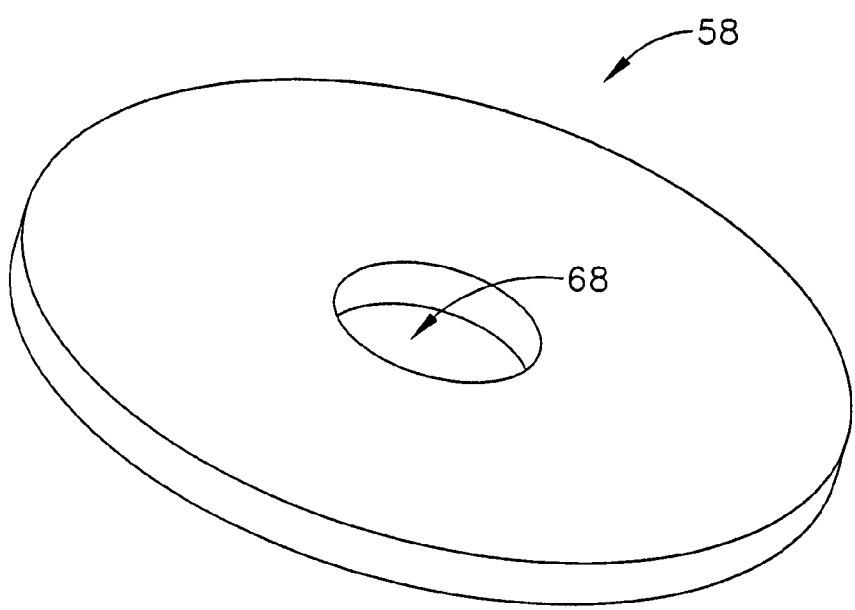
FIG. 9 is a perspective view of an embodiment of a wafer configured to fit in the plate of FIG. 7.

In an alternate embodiment, shown in FIGS. 7 through 9, plate 40D is configured to receive wafer 58. In this embodiment, plate 40D has center opening 62 formed therethrough. Opening 62 is in fluid communication with channel 48 in proximal end 42 of plate 40D. Opening 62 is defined by inner annular ridge 64, which is recessed within plate 40D to provide recess 56*a*.

An exemplary removable wafer is shown in FIG. 9. Wafer 58 may be positioned within recess 56*a*. As shown, shape of wafer 58 corresponds to shape of recess 56*a*. While wafer 58 is shown as generally circular to correspond with generally circular recess 56*a*, it will be appreciated that wafer 58 may correspond to any other shape. By way of example only, wafer 58 may be generally square to correspond with generally square recess 50, generally "T"-shaped to correspond with generally "T"-shaped recess 54, or any other shape to correspond with a different recess. Alternatively, wafer 58 may be shaped differently than recess 50 in which it is disposed, such that they do not correspond.

It will also be appreciated that wafer 58 may be used with any of plates 40A–C that lacks opening 62. In such an embodiment, wafer 58 may include a channel or conduit to facilitate entry of fluid into space between wafer 58 and recess 50. Alternatively, any of plates 40A–C may include an opening in addition to or as an alternative to recesses 50, 54, 56. Other combinations and variations will be apparent to those of ordinary skill in the art.

In one embodiment, annular ridge 64 is recessed 0.125" within plate 40D (i.e. the distance between annular ridge 64 and side surface 46 is 0.125"), while wafer 58 has a thickness of 0.1127". Recess 56*a* has a diameter of 2.4", while wafer 58 has a diameter of 2.35". Alternatively, recess 56*a* and wafer 58 are sized such that there is an interference fit between wafer 58 and plate 40D. Still other suitable dimensions for plate 40D and/or wafer 58 will be apparent to those of ordinary skill in the art.

During use of plate 40D having wafer 58 inserted in recess 56*a*, pressurized fluid communicated to and through channel 48 reaches opening 62, where it exerts an outward force on wafer 58. Wafer 58, in turn, exerts outward force on extremity 26 of tool 2. Thus, rather than having fluid exert force on extremity 26 directly, fluid exerts force on extremity 26 via wafer 58.

Wafer 58 configuration may be varied by size, shape, and/or by having one or more openings 68 formed in wafer 58. Such an opening 68 may permit some fluid to escape therethrough. Such escaping fluid may exert some force directly on extremity 26. By way of example only, wafer 58 with an opening 68 formed in its center may provide characteristics that differ from a wafer that has no opening. Alternatively, one wafer 58 that has an opening 68 of a first size may provide characteristics that differ from wafer 58 that has opening 68 of a different, second size.

In one embodiment, wafer 58 has opening 68 with a diameter of 0.475". Of course, the number and/or size of opening(s) 68 may vary greatly.

It will be appreciated that the size, shape, and/or number of openings 68 in wafer 58 may relate to the force exerted by wafer 58 on extremity 26. In addition, the size and/or number of openings 68 in wafer 58 may relate to the amount of fluid permitted to leak from tool 2. Other embodiments and uses for opening(s) 68 in wafer 58 will be apparent to those of ordinary skill in the art.

Wafer 58 may be made of any suitable material or materials. By way of example only, wafer 58 may be made of polyurethane, brass, or any other suitable material, including combinations thereof. In one embodiment, the material of which wafer 58 is made is softer than the material of which plate 40D is made. Alternatively, the respective materials may be of any other suitable relative hardness.

Of course, wafer 58 may be eliminated altogether. As will be apparent from the foregoing examples, the term "wafer" shall be broadly construed to include any member that may be inserted in recess 50, 54, 56, 56*a* of plate 40A–D.

Those of ordinary skill in the art will also appreciate the various tool 2 properties that may be varied by using plates 40D having different recess 50 and/or wafer 58 configurations or properties. By way of example only, the fluid pressure required to cause outward bending of extremities 26 may vary depending on recess 50 configuration. In addition, or in the alternative, the rate at which the diametric distance between cutting blades 20 varies with fluid pressure may be a function of recess 50 and/or wafer 58 configuration. Still other effects of varying plate 40D, recess 50 through 56*a*, and/or wafer 58 configuration will be apparent to those of ordinary skill in the art.

During use, such as when tool 2 is being used to cut a bore having a high length-to-diameter ratio in a workpiece, by way of example only, a user may selectively adjust the pressure of fluid being communicated to tool 2. Of course, the same may be true for other cutting bores. Those of ordinary skill in the art will recognize that such pressure adjustments of communicated fluid will also adjust the pressure of fluid within tool 2. As the fluid pressure is increased, the fluid will be directed outward by recesses 50 in side surfaces 46 of plate 40A, thereby exerting an increasing, outward force against side surfaces 36 of slot 30 (i.e. outward force increases with fluid pressure). When the fluid pressure reaches a sufficient level, this force will cause extremities 26 to bend radially outward (i.e. side surfaces 36 of slot will be deflected outward by the fluid), thereby urging cutting blades 20 radially outward. This will increase the effective diameter of distal end 6 of tool 2. By way of example only, such diametric expansion may be achieved with fluid pressures ranging from approximately 200 psi to 800 psi. Of course, other fluid pressure amounts may cause expansion based on a variety of factors (e.g. tool material, fluid density, thickness of extremities, etc.).

Accordingly, extremities 26 and slot 30 may constitute a selective bias portion of tool 2. In other words, extremities 26 and slot 30 are configured to selectively bias cutting blades 20 to a variety of use positions. Of course, a selective bias portion of tool 2 may include other elements.

In the present example, the radial positioning of cutting blades 20 with respect to the axis of tool 2 may be adjusted according to the pressure of the fluid being communicated to and through tool 2, such that increasing fluid pressure will increase the diametric distance between cutting blades 20. Accordingly, tool 2 may be used to cut or ream bores of different diameters, as the diametric distance between cutting blades 20 may be varied as a function of fluid pressure. In one embodiment, when fluid pressure is decreased, the resilience of the material of which tool 2 is made causes extremities 26 to return back (i.e. radially inward) to their prior configuration. Such resilience may be found where tool 2 is made of steel or any other metal, alloy, or the like. Other suitable materials for making tool 2 will be apparent to those of ordinary skill in the art. In addition, other ways in which extremities 26 may be caused to return back to a prior configuration will be apparent to those of ordinary skill in the art (e.g. inducing a vacuum condition in conduit 8, magnetically or mechanically pulling extremities together, etc.).

It will be appreciated that, in the present example, the pressurized fluid will tend to leak at distal end 6 of tool 2 during use of tool 2. This leakage will occur at distal end 6 between side surfaces 36 of slot 30 and side surfaces 46 of plate 40A. In other words, the outward bending of extremities 26 will tend to create gaps between side surfaces 36 of slot 30 and side surfaces 46 of plate 40A, and the pressurized fluid will leak from these gaps. It will be appreciated that, due to the proximity of such gaps to cutting blades 20, the leaking fluid may easily reach at least a portion of the interface between tool 2 and the workpiece. This will be particularly so considering the relatively high pressure of the fluid when it leaks, such that the fluid will tend to spray out from the gaps at a high velocity. Such spraying leakage may provide cooling and/or lubrication of the interface between tool 2 and the workpiece. Accordingly, the suitability for cooling and/or lubricating such interfaces may be considered during the selection of a fluid to be communicated through conduit 8 of tool 2.

Figure 10A:
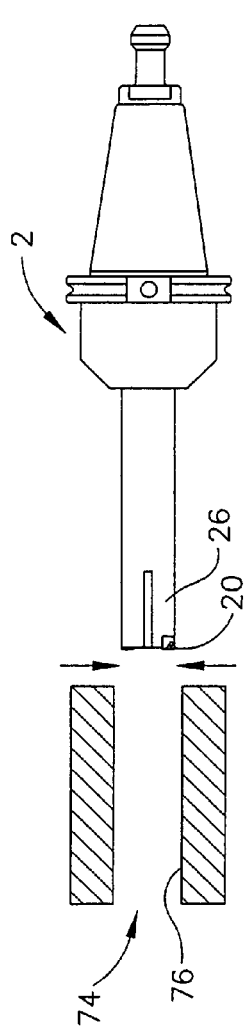
FIGS. 10A through 10E are series views of the tool of FIG. 1 in use.
Figure 10B:
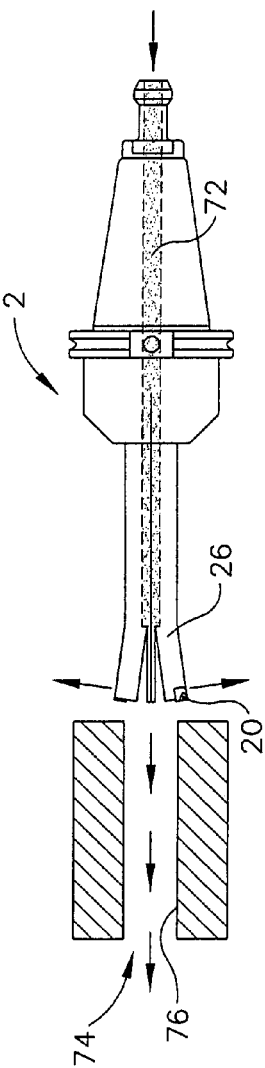
Figure 10C:
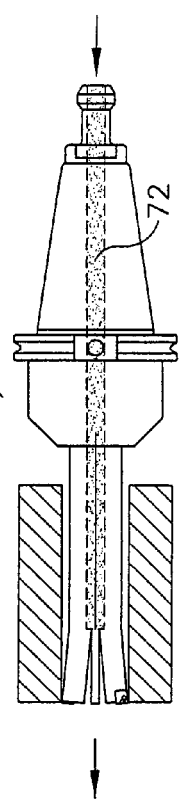

Those of ordinary skill in the art will appreciate the speed with which tool 2 may be used to cut or ream multiple bores in a given time frame. The following merely illustrative example, portions of which are shown in FIGS. 10A through 10E, outlines a method by which tool 2 may be used to produce several bores in a relatively short time. First, as shown in FIG. 10A, rotation of tool 2 is initiated by spindle at a machining station (not shown). Next, as shown in FIG. 10B, the pressure of fluid 72 being communicated to tool 2 (and hence, through tool 2) is increased to a level sufficient to cause extremities 26 to bend outward until cutting blades 20 are separated at a desired diametric distance. Then, as shown in FIG. 10C, rotating tool 2 is linearly advanced along the axis of bore 74, such that the axis of tool 2 is aligned with the axis of bore 74. It will be appreciated that, during this stage of advancement, cutting blades 20 of tool 2 will engage with surface of bore wall 76 in a cutting or reaming fashion.

Figure 10D:
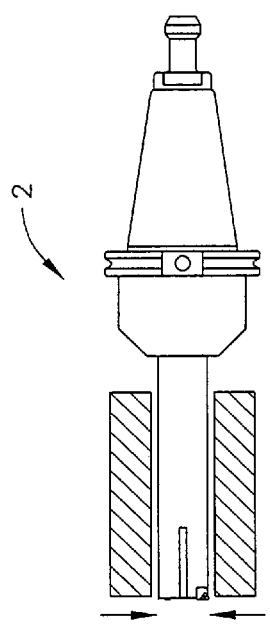
Figure 10E:
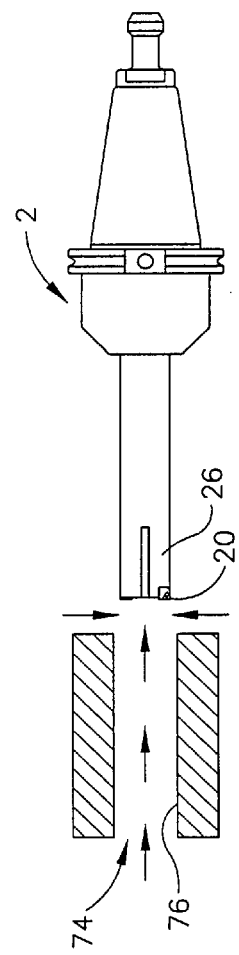

When tool 2 has been advanced into bore 74 to the desired length (e.g., such that cutting blades 20 have passed completely through bore 74 or to its desired end), fluid 72 pressure in tool 2 may then be reduced, as shown in FIG. 10D. This reduction in fluid 72 pressure will proportionally reduce the magnitude of the radially outward forces immediately being exerted against side surfaces 36 of slot 30 by fluid 72 being deflected by respective recesses 50 in plate 40A (or by wafer 58, as the case may be). This reduction of force will permit the resilience of the material comprising distal end 6 of tool 2 to cause extremities 26 to return back radially inward, thereby decreasing the diametric distance between cutting blades 20. This decrease in the diametric distance between cutting blades 20 will nearly instantaneously cause disengagement of cutting blades 20 with bore wall 76. As shown in FIG. 10E, tool 2 may then be linearly withdrawn from bore 74 along the axis of bore 74. Tool 2, while still rotating, may then be moved to the next bore for a similar process. Alternatively, the workpiece may be moved to align the axis of the next bore with the axis of tool 2 before the process is repeated.

Accordingly, the rotation of tool 2 may be kept substantially constant as tool 2 cuts or reams a plurality of bores. In other words, the rotation of tool 2 need not be stopped or re-started between bores. Furthermore, tool 2 may be used to cut or ream a bore in a single, one-dimensional linear movement along the axis of the bore. Thus, while tool 2 is disposed within the bore, the axis of tool 2 may remain aligned with the axis of the bore during the advancement and retraction of tool 2 through the bore.

Other suitable methods for using tool 2 will be apparent to those of ordinary skill in the art.

It will be apparent to those of ordinary skill in the art that while several embodiments of the invention have been disclosed in detail, numerous other modifications and improvements may be made thereon.

For example, those of ordinary skill in the art will recognize that it is not necessary to use a pair of opposing cutting blades 20 at distal end 6. As an alternative, any other number of cutting blades 20 may be used. In an alternate embodiment, distal end 6 has a single cutting blade 20 with an opposing support pad similar to the type described in U.S. Pat. No. 6,270,295. In another alternate embodiment, distal end 6 has a single cutting blade 20 with no opposing support pad. In yet another alternate embodiment, distal end 6 has three or more cutting blades 20. In one embodiment, where distal end 6 has more than one cutting blade 20, cutting blades 20 will be spaced apart equidistantly about circumference of tool 2. In addition, tool 2 may have more than two extremities 26, each having a respective cutting blade 20. Still other suitable cutting blade 20 configurations will be apparent to those of ordinary skill in the art.

Those of ordinary skill in the art will also appreciate that tool 2 need not have any cutting blades 20 at all. In an alternate embodiment, tool 2 has rollers electroplated with or otherwise coated in diamond grit or Cubic Boron Nitride grit positioned proximate to where cutting blades 20 would be. By way of example only, tool 2 may be fitted with rollers similar to those described in U.S. Provisional Application Ser. No. 60/549,583, entitled "Method and Apparatus for Patterning of Bore Surfaces," filed on Mar. 3, 2004, the disclosure of which is incorporated by reference herein. In this embodiment, grit may be approximately 0.006" in size. Of course, any other size of grit or other protuberance may be used. Grit may be used to impinge a pressure on the surface of a bore wall at approximately 10,000 pounds per square inch. Of course, any other amount of pressure may be used.

In addition, or in the alternative, tool 2 may be configured similar to the tool disclosed in U.S. Non-Provisional application Ser. No. 10/654,328, entitled "Tool With Selectively Biased Member and Method for Forming A Non-Axis Symmetric Feature," filed on Sep. 3, 2003, the disclosure of which is incorporated by reference herein.

As an alternative to tool 2 having plate 40A with recesses 50 opening outwardly, tool 2 may have a pair of symmetrical plates with recesses opening inwardly, such that the recesses face each other when the plates are positioned together in slot 30. In this or similar alternate embodiments, outward forces may be exerted upon extremities 26 by the plates, as the plates will be urged outwardly by the pressurized fluid.

It will also be appreciated that, while slot 30 and plate 40A have been shown in the present example as being generally rectangular, slot and plate may be of any other shape. By way of example only, slot and plate may be generally square, cylindrical, or any other substantially uniform cross-sectional shape, such as circular, elliptical, ovular, or triangular. Alternatively, slot and plate may be conical, frusto-conical, pyramid-shaped, or any other suitable shape. In one embodiment, slot 30 is generally of the same shape as plate 40A–D.

While tool 2 has been discussed as being particularly suitable for cutting bores having a relatively high length-to-diameter ratio, it will be appreciated that tool 2 is also suitable for use with bores having a relatively small length-to-diameter ratio, or any other types of bores. In addition, while tool 2 has been discussed as being suitable for cutting or reaming bores, it will be appreciated that tool 2 is also suitable for a variety of other types of machining and other operations.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A tool for working a workpiece, the tool comprising:
   (a) an elongate member comprising:
      (i) a central axis defining axial, angular, and radial directions,
      (ii) first and second ends,
      (iii) at least two extremities located at the first end, at least one of the at least two extremities comprising at least one blade member,
      (iv) a slot adjacent the at least two extremities, wherein the slot extends toward the second end and opens at the first end, the slot being configured to receive an insert member,
      (v) a conduit, wherein the conduit is in fluid communication with the slot; and
   (b) an insert member positioned in the slot, the insert member comprising a plate having a first and second end and two sides, at least one of the two sides having a recessed portion, wherein the recessed portion comprises a recess and a channel extending from the second end of the plate to the recess, the channel being configured to communicate fluid from the conduit to the recess, and wherein the insert member is configured to direct fluid communicated to the slot toward one or more of the at least two extremities.

2. The tool of claim 1, wherein the slot extends along the central axis.

3. The tool of claim 1, wherein the insert member comprises one or more openings formed through each of the two sides, wherein the recessed portion is adjacent at least one of the one or more openings.

4. The tool of claim 3, further comprising at least one wafer disposed in the recessed portion.

5. The tool of claim 3, wherein the at least one recessed portion comprises a ridge defining at least one of the one or more openings.

6. The tool of claim 1, wherein the insert member is configured to vary the distance between the at least one blade member and the central axis as a function of pressure of the fluid.

7. A tool system for working a workpiece, the tool system comprising:
   (a) a tool, comprising:
      (i) a central axis which defines axial, angular, and radial directions,
      (ii) at least one blade member including a blade configured to remove material from a workpiece, said at least one blade member being substantially constrained in the axial and angular directions, said at least one blade member being configured to move through a range of travel in the radial direction, and
      (iii) at least one inserted member positioned in line with the central axis adjacent said at least one blade member, the at least one inserted member comprising a plate having a first and second end and two sides, at least one of the two sides having a recessed portion, wherein the recessed portion comprises a recess and a channel extending from the second end of the plate to the recess, the channel being configured to communicate fluid from a conduit to the recess;
   (b) a rotary actuation device configured to drive the tool to rotate about its central axis; and
   (c) a pressurized fluid supply in fluid communication with the at least one inserted member for selectively biasing the at least one blade member in the radial direction to at least one of a plurality of alternative use positions.

8. The tool system of claim 7, further comprising a slot positioned in the tool along the central axis, wherein the inserted member is disposed in the slot.

9. The tool system of claim 7, wherein the conduit is in fluid communication with the pressurized fluid supply and the inserted member.

10. The tool system of claim 9, wherein the conduit is positioned along the central axis.

11. The tool system of claim 7, wherein the blade member is mounted to an extremity of the tool, wherein the pressurized fluid has a flow, wherein the inserted member is configured to direct the flow of the pressurized fluid toward each extremity.

12. A tool, comprising an elongate cylindraceous member, the cylindraceous member comprising:
 (a) first and second ends positioned on a tool axis, the second end being configured to couple with a rotary actuation device;
 (b) a conduit in fluid communication with the second end and the first end;
 (c) one or more cutting members located proximate to the first end, each of the one or more cutting members being positioned at a respective first distance from said tool axis; and
 (d) a plate positioned proximate to the first end, the plate comprising a first and second end and two sides, each of said two sides having a recessed portion comprising a recess and a channel, the channel extending from the second end of the plate to the recess, wherein the channel is configured to communicate fluid from the conduit to the recess, each recessed portion being configured to receive a fluid medium from the conduit;
 wherein said plate is configured to divert flow of the fluid medium to cause at least one of said one or more cutting members to be positioned at a second distance from said tool axis.

13. The tool of claim 12, wherein the first end has a circumference, wherein two or more of the one or more cutting members are positioned equidistantly about the circumference.

14. The tool of claim 12, wherein the conduit is positioned along the tool axis.

15. The tool of claim 12, further comprising two or more extremities, wherein the one or more cutting members are positioned on at least one of the two or more extremities.

16. The tool of claim 15, further comprising a slot positioned adjacent the two or more extremities, wherein the plate is positioned within the slot.

17. The tool of claim 16, wherein the slot and the plate are positioned along the tool axis.

* * * * *